C. J. ALLEN.
AGRICULTURAL IMPLEMENT.
APPLICATION FILED MAR. 26, 1917.
1,389,113.
Patented Aug. 30, 1921.
2 SHEETS—SHEET 1.
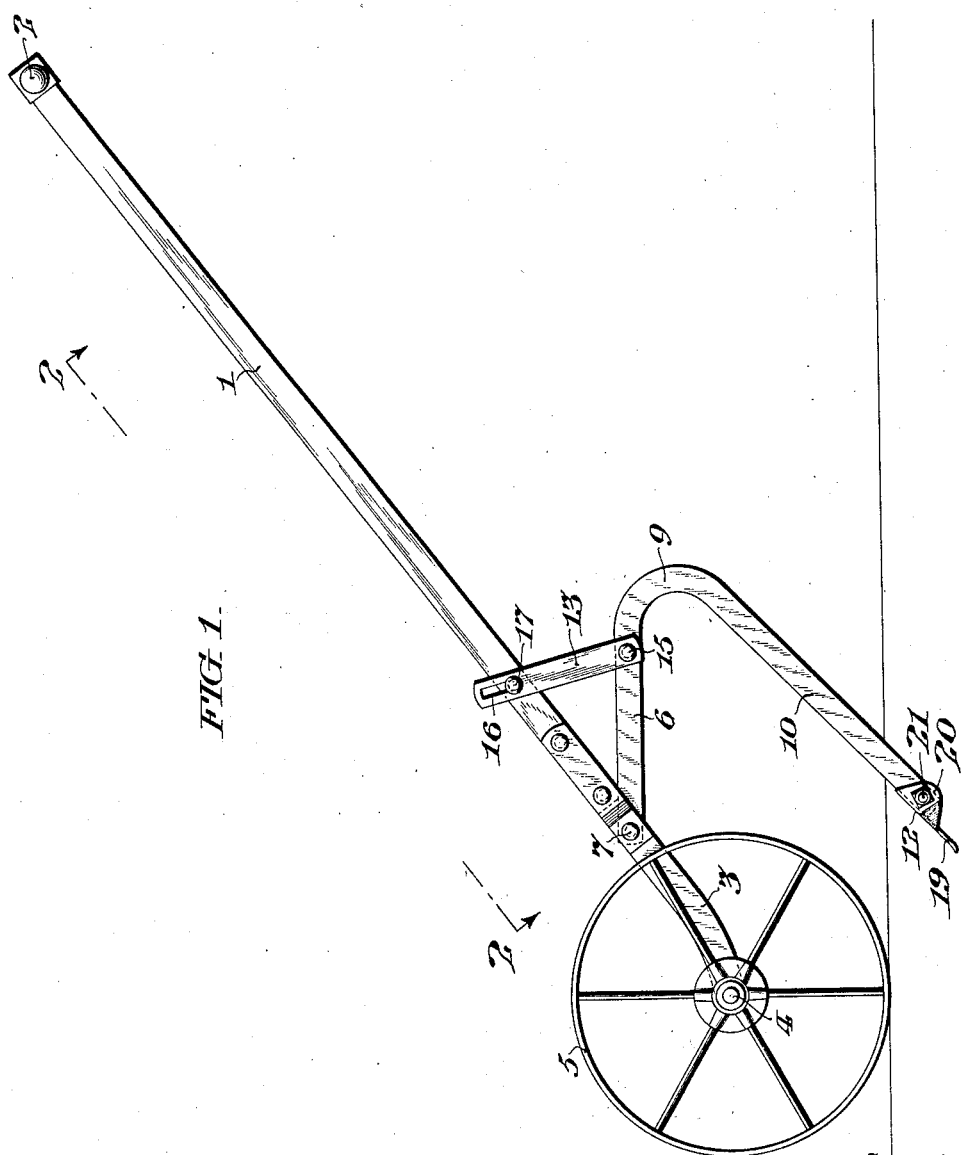

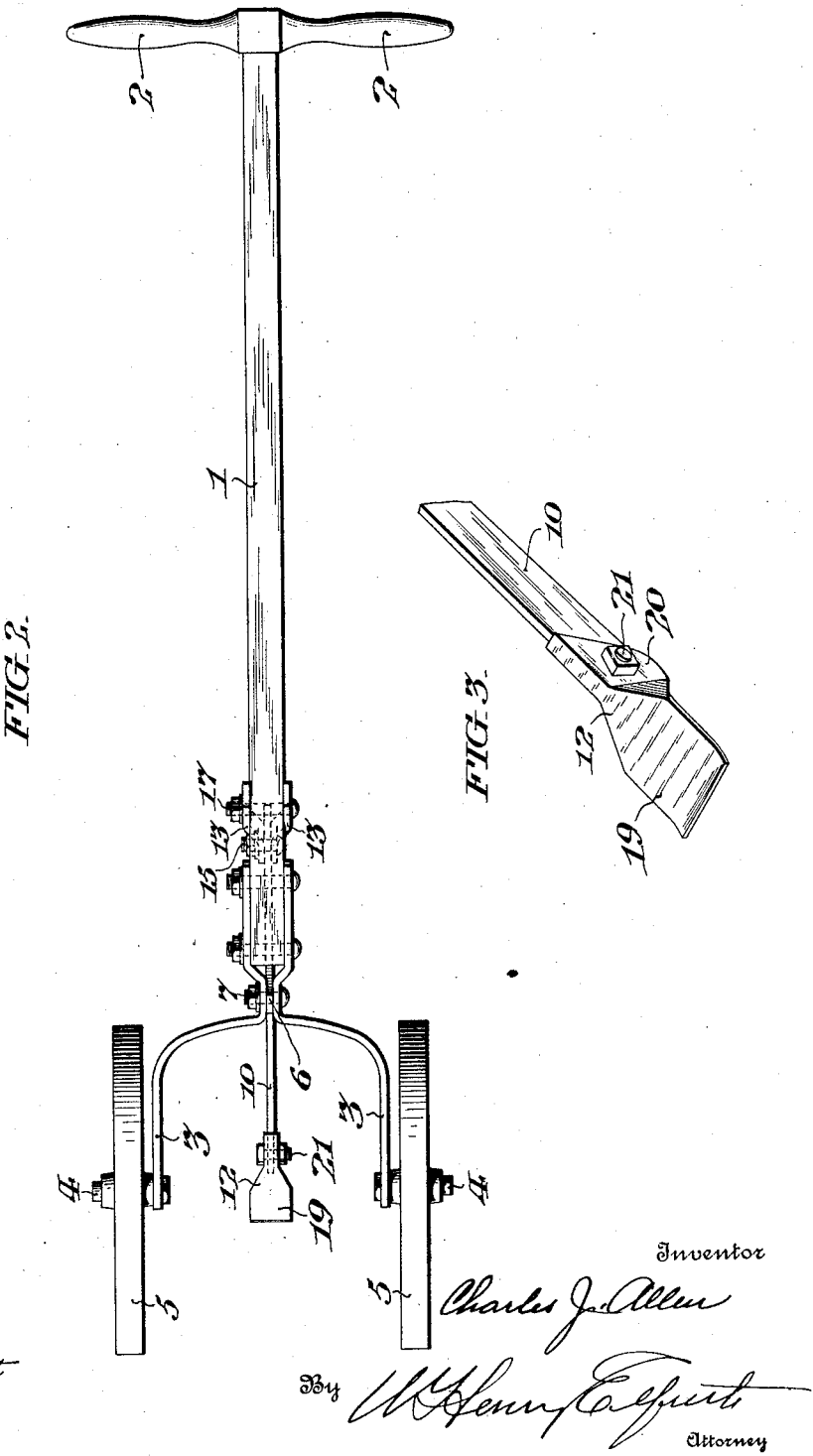

UNITED STATES PATENT OFFICE.

CHARLES J. ALLEN, OF MOORESTOWN, NEW JERSEY.

AGRICULTURAL IMPLEMENT.

1,389,113.　　　　Specification of Letters Patent.　　Patented Aug. 30, 1921.

Application filed March 26, 1917. Serial No. 157,386.

*To all whom it may concern:*

Be it known that I, CHARLES J. ALLEN, a citizen of the United States, residing at Moorestown, in the county of Burlington and State of New Jersey, have invented new and useful Improvements in Agricultural Implements, of which the following is a specification, reference being had to the accompanying drawings.

My invention relates particularly to that class of agricultural implements that are commonly known as wheel hoes, and is especially directed to such devices as are adapted to perform the excavation or harvesting of onions and similar tubers.

The principal objects of my invention are to provide such an implement with an excavating tool so formed as to offer but slight resistance to the ground through which it is progressed, to excavate and deposit the subterranean growth within a laterally restricted zone, and to effect with facility the shedding of the superterranean growth from said tool.

Other objects of my invention are to provide an implement adapted for excavating subterranean growth that will avoid cutting or bruising the vegetation excavated, and that will not only perform the excavation, but which will tend to withdraw said growth from the ground, and deliver it adjacent to the center of the row from which it is extracted.

My invention, specifically stated, comprehends a wheel hoe provided with an adjustable bracket having its free forward portion extended forwardly in acute oblique relation to the surface of the ground, and carrying a narrow chisel-shaped tool arranged to be progressed thereby through the subsoil, beneath the tubers, or other vegetable growth, to be excavated.

My invention also includes all of the various novel features of construction and arrangement as hereinafter more definitely specified.

In the accompanying drawings, Figure 1 is a side elevational view of a wheel hoe equipped with excavating mechanism constructed in accordance with my invention; Fig. 2 is a plan view of the structure shown in Fig. 1 as viewed from the plane indicated by the line 2—2 in Fig. 1; and Fig. 3 is a fragmentary perspective view of the excavating mechanism *per se.*

In said figures, handle bar 1 having the hand grips 2 is connected by the wheel fork comprising the forwardly extended prongs 3, with the respective shafts 4 of the carrier wheels 5 which are relatively spaced to suitably straddle the row of vegetation to be excavated.

The tool carrying arm 6 is pivotally mounted between the prongs 3 at their region of approach upon the pivot 7, and extends rearwardly and is provided with a sharply turned elbow 9, so as to provide the forwardly and obliquely extended portion 10 upon the free end of which the excavating chisel-shaped tool 12 is secured.

The tool carrying arm 6 is arranged to be connected in rigid relation to the handle bar 1, by the links 13 which extend upon either side of the handle bar 1 and tool arm 6. Said links are pivotally connected by the bolt 15 with the tool arm 6 and are provided with longitudinal slots through which the bolt 17 which extends through the handle bar 1, extends, so as to clamp said links to said handle bar in any desired adjusted position according to the depth to which the excavating tool 12 is to be thrust. Said tool 12 may be sheet metal stamping having the flat chisel-like blade 19, and having the parallel ears 20 embracing the portion 10 of the arm 6 and secured thereto by the bolt 21.

It may be here noted that the tool carrying arm 6 is so formed that the portion 10 to which the excavating tool is secured, is maintained at such an angle with respect to the surface of the ground and is of such length that the superterranean growth will readily ride up the inclined forward edge and consequently tend to withdraw the subterranean growth from the ground.

It will be also observed that the action of such growth riding up the inclined portion 10, which is disposed at substantially the angle of slip, and tends to untangle and in effect straighten out the tops of the vegetation, especially is this true when excavating onions.

My invention is advantageous in that a tool and its supporting arm constructed in accordance therewith minimizes the resistance offered by the ground and as a consequence much more work per given length of time may be performed by the operator than with devices as heretofore constructed.

I do not desire to limit my invention to the precise details of construction and arrangement herein set forth as it is obvious that various modifications may be made therein without departing from the essential features of my invention as defined in the appended claims.

Having thus described my invention, I claim:

1. An implement of the class described comprising a tool carrying arm having its broadest dimension extended in the vertical longitudinal plane of said implement, and having a horizontally extended portion connected by a sharp turned elbow with a straight unobstructed downwardly inclined tool carrying portion, said inclined portion forming an angle with the ground greater than the angle of slip of the superterranean vegetable growth with which it may coöperate.

2. An implement of the class described, comprising a pair of oppositely bent side frame members having their forward and rearward ends extending parallel with each other in spaced relation, the forward ends being provided with wheel bearings, and the rearward ends being connected with a handle, and intermediate portions approaching each other, a tool arm pivoted between said intermediate portions, above the axial plane of said wheel bearings, and providing a long, forwardly-inclined, straight, unobstructed portion arranged to carry a cultivating tool.

3. An implement of the class described, comprising a frame having spaced wheel bearings, supporting wheels for said frame, a handle connected with said frame, and a tool-carrying arm pivoted to said frame on an axis disposed above the horizontal plane of the wheel bearing axis; said tool-carrying arm being substantially V-shaped and having one leg disposed substantially parallel with the surface of the ground, and the other inclined forwardly and providing a straight edge extending well above the plane of the wheel bearing axis at an angle that will permit the tops of vegetation to readily slip and be thereby untangled.

In testimony whereof, I have hereunto set my hand in the presence of two subscribing witnesses.

CHARLES J. ALLEN.

Witnesses:
ALBERT S. PETTIT,
MAY N. PETTIT.